Feb. 9, 1943.  H. W. LEVERENZ  2,310,852
LUMINESCENT LIGHT SOURCES AND METHOD OF MANUFACTURE
Filed Aug. 21, 1940
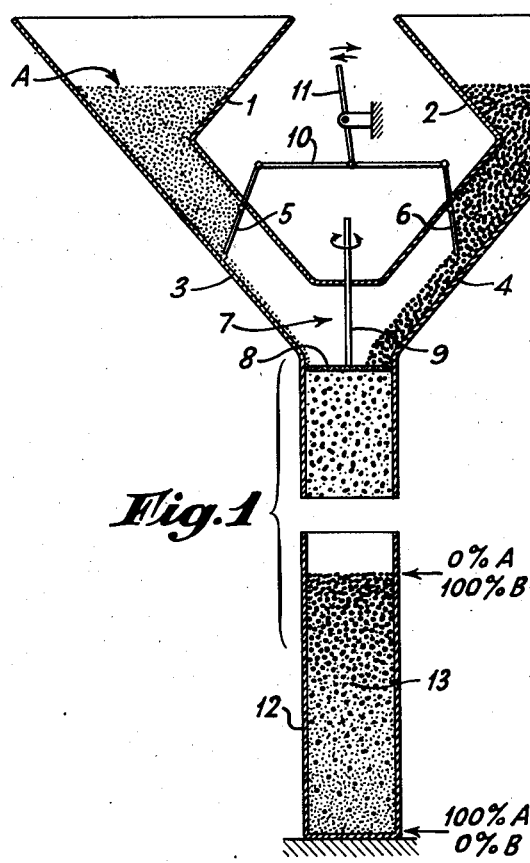
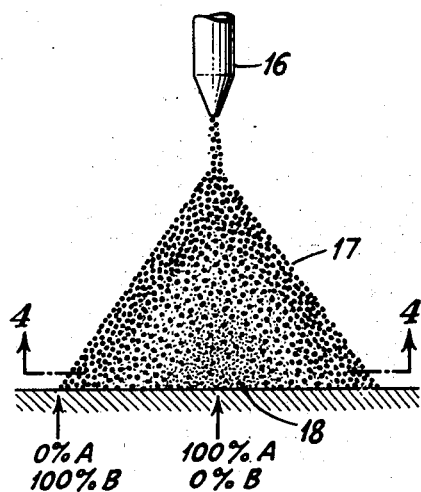
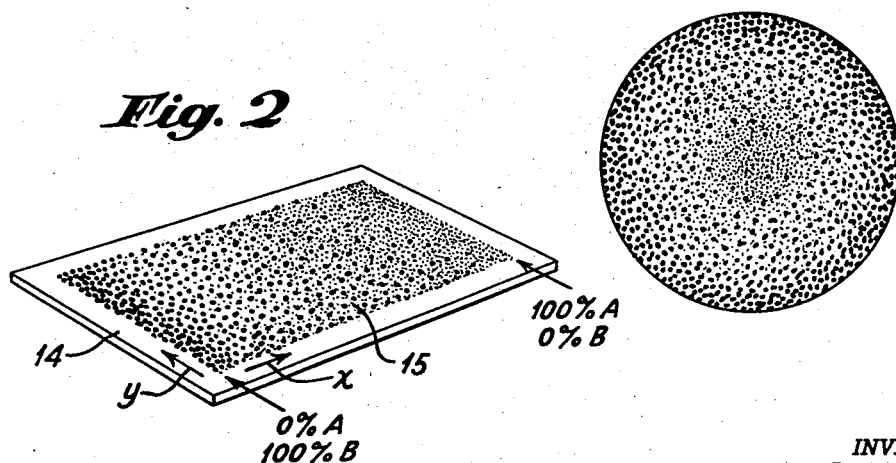
INVENTOR
HUMBOLDT W. LEVERENZ
BY
ATTORNEY Patented Feb. 9, 1943

2,310,852

UNITED STATES PATENT OFFICE 2,310,852

LUMINESCENT LIGHT SOURCE AND METHOD OF MANUFACTURE

Humboldt W. Leverenz, South Orange, N. J., assignor to Radio Corporation of America, a corporation of Delaware Application August 21, 1940, Serial No. 353,461

13 Claims. (Cl. 250—80)

My invention relates to variable color luminescent light sources and to methods of manufacturing such light sources.

Luminescent materials capable of generating specific colors such as red, orange, yellow, green, blue, and violet when subjected to radiant or corpuscular excitation are known and such materials have found considerable use in producing luminescent lamps of different colors. A single lamp having a variety of colors may be constructed by painting or otherwise applying different luminescent materials to a suitable foundation in the form of strips or segments, the color of each strip or segment under the proper excitation being determined by the excitation properties of the specific luminescent material comprising the strip or segment.

It is an object of my invention to provide a luminescent member or material and method of manufacture wherein the color excitation from point to point along said material or member is continuously variable. Another object is to provide a variable color light source wherein the color under suitable excitation varies from the red through the violet portions of the spectrum by gradual changes in color; and a further object is to provide a light source resembling the color spectrum over the visible range of colors and wherein the colors merge from one to the other in the same order as in the conventional light spectrum.

In accordance with my invention I provide a luminescent member and method of manufacture wherein the composition of the luminescent member composed of a plurality of luminescent materials of different spectral emission characteristics is varied from point to point along one or more dimensions of said member.

These and other objects, features and advantages of my invention will be apparent upon consideration of the following description of my variable color light source and method of manufacture when taken in connection with the accompanying drawing in which:

Figure 1 is a schematic representation of an apparatus suitable for practicing my method and a partially completed luminescent member;

Figure 2 is a representation of a luminescent member or screen made in accordance with my invention;

Figure 3 shows a modification in my method of manufacture and a partially completed luminescent member, and Figure 4 is a cross-section of the member shown in Figure 3 taken along the lines 4—4.

In accordance with my invention I mingle or mix two or more luminescent materials or the constituents of such materials having different spectral emission characteristics and continuously vary the rate at which each of said materials is mingled, deposited or mixed, whereby the combined spectral emission of said materials under excitation such as corpuscular or radiant energy will vary from point to point over an exposed area of said mixture.

Referring to Figure 1 which shows a schematic embodiment of an apparatus suitable for practicing my method, I have shown two hoppers 1 and 2 for holding a supply of two luminescent materials, either in the activated crystal form, or the mixed constituents of two such materials, the materials being chosen to have different spectral emission characteristics under the influence of any desired excitation means. The hopper 1, for example, may be provided with a material designated A, such as zinc sulfide suitably activated, such as by silver, as well known in the art, which under excitation will produce a blue-violet color. In the hopper 2 there is provided a material designated B, such as cadmium sulphide, silver activated, which under the same excitation will produce a reddish color. While I have described above the use of activated luminescent materials in the crystallized state, it is to be understood that the constituents of these materials may be used instead of the materials in crystallized form, it being understood that when I refer to materials having different spectral emission characteristics I am referring to the crystallized materials or their constituents. The following table shows a number of representative materials constituting the materials A and B and the color range obtainable with such materials. Only four examples are given but it should be understood that I am not limited to these specific examples since other materials capable of giving a desired color range may be used:

| Example | Material A | Material B | Color range |
|---|---|---|---|
| 1 | ZnS:Ag | CdS:Ag | Blue-violet to red. |
| 2 | ZnS:Cu | CdS:Cu | Blue-green to infra red. |
| 3 | Zinc silicate:Mn | Beryllium silicate:Mn. | Blue-green to orange-red. |
| 4 | Zinc borate:Mn | Cadmium borate:Mn. | Green to orange-red. |

Referring again to Figure 2, the hopper 1 is provided with an outlet chute 3 and the hopper 2 with an outlet chute 4, each of which is provided with a butterfly-type valve 5 and 6. The chutes 3 and 4 converge and join in the region 7, and it will be obvious that as the valves 5 and 6 are opened or closed the amount of material from each of the hoppers 1 and 2 may be varied at the point of junction of the two chutes 3 and 4. Means such as the screen 8 affixed to a rotating or vibrating rod 9 may be utilized to mix the two materials from the two hoppers. Obviously while I have shown but two hoppers in which two materials having different spectral emission characteristics may be placed, it is to be understood that for mixing a greater number of materials a corresponding number of hoppers may be utilized.

In accordance with my invention the materials A and B in the respective hoppers 1 and 2 are allowed to flow into the region 7 at inversely proportional rates so that when a maximum of one material is flowing, the flow of the other material is approaching a minimum. Such a rate of flow may be provided by a linkage mechanism 10—11 so proportioned that the valve 5 approaches a closed position at the time the valve 6 is approaching its maximum open condition. Such mechanisms, while not the subject matter of this invention, may be provided to give a rate of flow of one material with respect to the other either of a linear characteristic or a characteristic of any desired function, the principal requirement being that the rate of flow of one material varies from minimum to maximum, while the rate of flow of the other material is varying from maximum to minimum. The absolute rates of flow of the two materials is immaterial but the maximum flow from each of the hoppers should be relatively low to insure proper mixing by the screen 8.

Below the screen 8 I have shown a vessel 12 which collects the materials A and B falling from the mixing screen 8. The vessel 12 may be of any suitable cross-section such as circular or rectangular, but I prefer to provide the outlet of the hopper and feed mechanism of substantially similar shape so that if the vessel 12 is rectangular, the screen and the outlet of the apparatus above the vessel are likewise preferably rectangular or at least elongated, in which case the chutes 3 and 7 and hoppers 1 and 2 are likewise elongated to provide a uniform deposition of the mixed material over the entire cross-sectional area of the vessel 12.

In operation the butterfly valve 5 is operated from a maximum open position to a closed position, while simultaneously opening the valve 6 from a closed position to a maximum open position by swinging the mechanical link 11 through the desired angular displacement. As shown in Figure 1 the valve 6 has been opened to approximately its maximum desired opening, while the valve 5 is shown approaching the closed position. In the example shown, the vessel 12 is, therefore, substantially filled following this operational sequence with a portion of the materials A and B to form a quantity or mass of material. I will refer to this quantity of mingled material as the member 13 since it may be compacted into a solid mass as described later. This member 13 has a maximum concentration of material A such as 100% at the bottom of the vessel 12, decreasing to a minimum such as zero per cent at the top of the vessel 12, whereas the member has a B material content which is a minimum such as zero per cent at the bottom of the vessel 12 and a maximum or 100% at the top.

The mixing may be non-linear with respect to the change of concentration from one end to the other to simulate the natural dispersion of a prism or to emphasize a particular color and, in fact, the member 13 need not vary from zero per cent to 100% of the two materials A and B over the length of the member. Thus, only a limited range of merging colors may be desired and the composition may, therefore, vary by an amount within the maximum range such as the colors produced by a variation in composition of from 80%A 20%B to 20%A 80%B from one end of the member to the other. The member 13, as indicated above, may comprise either the crystallized luminescent materials or the constituents of two luminescent materials having different spectral emission characteristics. The crystallized materials may be compacted as referred to above to form an elongated luminescent member 13 either with or without the use of a binder and used as a luminescent body without further processing. However, if the materials A and B are composed of the uncrystallized constituents of the luminescent materials having different spectral emission characteristics, the materials in the vessel 12 may be moistened with water compacted and fixed to the crystallizing temperature of the materials A and B. I have found that it is desirable to fire conventional luminescent material constituents at 600° to 1400° C. to crystallize the materials. For zinc sulfide and cadmium sulfide mixtures a good average temperature is 880° C. for 20 to 120 minutes (from a cold start in the furnace), although it is desirable that the temperature be about 50 to 100° C. higher at the zinc sulfide end, or in the example given above, at the bottom end of the member 13. The resulting body or member 13, if of circular cross-section, may be referred to as a luminescent pencil which, if made of the zinc sulfide-cadmium sulfide combination, luminesces violet-blue at the zinc sulfide end and very gradually changes in color through the intermediate spectral colors to a red at the cadmium sulfide end. The pencil may be removed from the vessel 12 and used as is, or it may be mildly crushed such as by a roller moving perpendicularly to the pencil axis and the resultant powder sifted through a wire mesh screen and deposited on a suitable foundation, or the resultant powder may be fed into a spray gun and sprayed upon a foundation in such a manner that the sprayed particles on the foundation vary in luminescent color upon excitation from red to blue.

It is to be understood that the luminescent bodies, members, and screens are suitable for use in a great number of applications such as in luminescent lamps either of the ultra-violet, gas, or vapor discharge types, whether the luminescent material is provided within or located outside the lamp envelope, in cathode ray tubes, X-ray screens, and in other applications utilizing luminescent materials.

The arrangement illustrated in Figure 1 is adapted to the manufacture of luminescent members of the self-supporting type, that is, members having a relatively large volume, but may be adapted to the manufacture of thin luminescent members usually referred to as luminescent screens such as shown in Figure 2 wherein it is desired to coat a foundation 14 with a thin coating of luminescent material. The member or screen 15 is deposited on the foundation 14 either by the spraying method referred to above and utilizing the member 13 as a source of luminescent material, or by moving the foundation 14 under the screen 8 of Figure 1 at a uniform rate or at a variable rate provided a variable thickness screen is desired. It is obvious that for the manufacture of such a screen 15 the outlet from the two chutes is preferably elongated and relatively narrow so that the concentration of materials along the Y axis shown in Figure 2 is uniform but varies either linearly or in some other manner along the X axis. Thus, if the foundation is moved from the left to the right under the screen 8 of Figure 1 during the above-dsecribed operating cycle of the valves 5 and 6, the composition of the screen 15 will be 100% of material A and zero per cent of material B at the right-hand end of the screen and such concentration will vary to zero per cent A and 100% B at the left-hand end. Obviously the crystallized materials may be settled directly on the foundation 14 either with or without the use of a suitable binder or the two materials such as A and B may be deposited on the foundation 14, followed by suitable firing as described above.

From a consideration of the mode of manufacture of the luminescent screen 15 it will be obvious that the concentration of the two materials is constant along the Y axis and variable along the X axis of the screen, which means that the relative quantities of said materials on a unit area of said foundation will vary in proportion to the linear distance from said unit area to another unit area on said foundation, or from one edge of the screen to the opposite edge.

While I have described in connection with Figure 2 a luminescent member or screen varying in composition from one edge to another edge, a member or screen having radial variation of the material composition may be made in accordance with my invention. Referring to Figures 3 and 4 which show a modification of my process suitable for making such radial color variable members or screens, the materials A and B such as from the hoppers 1 and 2 of Figure 1 may be fed to an outlet member 16 having a relatively small opening. The materials from the hoppers 1 and 2 are controlled through an operating cycle as referred to above, the mixed materials being allowed to fall upon a stationary platform or base and to build up in the form of a cone 17. From the above description it will be apparent that the concentration of the material A will be a maximum such as 80 or 100% at the base center 18 of the cone, while at this point the concentration of material B will be a minimum such as 20% or zero per cent and that this composition will vary along the base radius of the cone to a minimum such as 20% or zero per cent A and a maximum of B such as 80% or 100% at the base periphery. This produces a radial variation in concentration of the two materials and this variation may be linear or of any other desired function depending upon the rate of mixing of the two materials. This radial variation of the concentration of the two materials is shown in Figure 4, which is a cross-section of the cone 17, Figure 3 taken along the lines 4——4. Obviously the cone 17 may be made up of the crystallized materials with or without a suitable binder or may comprise the constituents of the two materials which may be sintered by firing as above described. Thin luminescent members may be provided from the cone 17 by slicing the base portion of the cone, or some of the material from the base of the cone member may be sifted through a wire mesh screen and deposited on a suitable foundation by rotating the cone about its axis while in contact with the screen to dislodge the luminescent materials from the base of the cone. It should be noted that a variation in the two material components such as A and B also occurs along the axis of the cone, and more generally, along the surface of any plane cutting the cone, so that many variable color effects may be obtained by slicing the cone either along a plane or curved surface depending on the particular color variation desired.

While I have indicated the preferred embodiments of my invention of which I am now aware and have indicated the specific applications as directed to luminescent lamps, cathode ray tubes, and other applications, it will be apparent that my invention is by no means limited to the exact forms described, or to its use in the specific applications referred to but that variations may be made in the particular structure and method of manufacture used without departing from the scope of the invention as set forth in the appended claims.

I claim:

1. The method of producing a luminescent material mixture which comprises simultaneously depositing a plurality of materials having different spectral emission characteristics and continuously varying the rate between predetermined limits at which each material is deposited to produce a mixture of said materials whereby the spectral emission will vary from point to point over an exposed area of said mixture at a rate substantially equal to the rate at which one of said materials is deposited.

2. The method of progressively coating a surface with two luminescent materials having different spectral emission characteristics which comprises simultaneously depositing said materials at predetermined different rates whereby the composition of the deposited material varies progressively from area to area over said surface in accordance with the said different rates of deposition.

3. The method of producing a variable color luminescent mixture which comprises settling a plurality of luminescent materials at inversely proportional rates over a period of time to produce a non-homogeneous mixture of varying composition from one point in said mixture to another point separated from said first point.

4. The method of producing a variable color luminescent material mixture which comprises depositing a luminescent material on a suitable surface, simultaneously depositing another luminescent material so as to mingle said first-mentioned material with said second material and varying the rate of deposition of one material inversely with respect to the rate of deposition of the other material.

5. The method of producing a variable color luminescent material mixture which comprises flowing two luminescent materials having different spectral emission characteristics together over a period of time, increasing during said period of time the rate of flow of one material and simultaneously decreasing the rate of flow of the other material to mingle said materials in accordance with said rates of flow.

6. The method of producing a mass of mixed luminescent materials comprising admitting the constitutents of two luminescent materials having different spectral emission characteristics into a confined space and varying the rates of admission of said materials in a manner inversely proportional to each other.

7. The method of producing a mass of materials according to claim 6 including the additional steps of compacting said materials and heating said materials to the crystallizing temperature of said materials to form a substantially solid mass.

8. The method of manufacturing a luminescent member having different color gradations from point to point therein comprising the steps of mixing two luminescent materials having different spectral emission characteristics at varying rates, and forming a cone shaped member of said materials to distribute said two materials throughout the volume of said cone in accordance with the rates at which said materials are mixed.

9. A luminescent member comprising a foundation and a coating on said foundation comprising luminescent materials having different spectral emission characteristics, the relative quantities of said materials on a unit area of said foundation varying in proportion to the linear distance from said unit area to another unit area lying in the same plane of said coating along said foundation.

10. A luminescent member comprising a foundation and a coating on said foundation comprising two luminescent materials having different spectral emission characteristics, said materials being substantially uniformly mixed in a direction normal to the coated surface of said foundation and the relative quantities of said materials covering said foundation varying from a preponderance of one of said materials to a preponderance of the other of said materials between two separated points along said foundation.

11. A luminescent member as claimed in claim 10 wherein the relative quantities of said materials vary from 100% and 0% to 0% and 100% between said two points along said foundation.

12. A luminescent member of extended area comprising a mixture of two luminescent materials, the relative concentration of said materials varying in direct proportion to the distance along the exposed surface of said member.

13. A luminescent member of extended area comprising two luminescent materials having different spectral emission characteristics, the quantity of one material uniformly increasing and the quantity of the other material uniformly decreasing along a line drawn between separated points along the exposed surface of said member.

HUMBOLDT W. LEVERENZ.